(12) United States Patent
Merkel et al.

(10) Patent No.: US 8,457,879 B2
(45) Date of Patent: Jun. 4, 2013

(54) INFORMATION DEVICE, METHOD FOR INFORMING AND/OR NAVIGATING A PERSON, AND COMPUTER PROGRAM

(75) Inventors: Marcel Merkel, Zurich (CH); Julia Ebling, Hildesheim (DE); Jan Karl Warzelhan, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 556 days.

(21) Appl. No.: 12/600,320

(22) PCT Filed: Jun. 12, 2008

(86) PCT No.: PCT/EP2008/057368
§ 371 (c)(1),
(2), (4) Date: Nov. 16, 2009

(87) PCT Pub. No.: WO2008/155283
PCT Pub. Date: Dec. 24, 2008

(65) Prior Publication Data
US 2010/0153003 A1    Jun. 17, 2010

(30) Foreign Application Priority Data
Jun. 12, 2007 (FR) ...................................... 07 04172

(51) Int. Cl.
*G01C 21/00* (2006.01)
*G05B 21/00* (2006.01)

(52) U.S. Cl.
USPC ........... 701/408; 701/519; 701/523; 340/541; 348/142

(58) Field of Classification Search
USPC .................. 701/408, 519, 523, 433; 348/143, 348/142; 382/103, 100
See application file for complete search history.

(56) References Cited

U.S. PATENT DOCUMENTS

| 5,715,325 | A | * | 2/1998 | Bang et al. | 382/118 |
| 6,154,133 | A | * | 11/2000 | Ross et al. | 340/541 |
| 7,504,942 | B2 | * | 3/2009 | Marman | 340/541 |
| 7,627,199 | B2 | * | 12/2009 | Sato et al. | 382/305 |
| 2002/0070858 | A1 | * | 6/2002 | Gutta et al. | 340/541 |
| 2002/0071032 | A1 | * | 6/2002 | Lyons et al. | 348/143 |
| 2002/0168084 | A1 | * | 11/2002 | Trajkovic et al. | 382/100 |
| 2004/0051644 | A1 | * | 3/2004 | Tamayama et al. | 340/686.1 |
| 2004/0183775 | A1 | | 9/2004 | Bell | |
| 2005/0197923 | A1 | * | 9/2005 | Kilner et al. | 705/27 |
| 2005/0254687 | A1 | * | 11/2005 | Asama et al. | 382/103 |

FOREIGN PATENT DOCUMENTS

| DE | 43 14 286 | 11/1994 |
| DE | 10 2005 021 736 | 11/2006 |
| EP | 1 566 788 | 8/2005 |
| GB | 2 429 098 | 2/2007 |
| WO | 03/032622 | 4/2003 |

* cited by examiner

Primary Examiner — Tan Q Nguyen
(74) Attorney, Agent, or Firm — Michael J. Striker

(57) ABSTRACT

The invention relates to a housing for protecting an electronic device (1) to be fitted to a motor vehicle, the housing comprising a plurality of shells (2, 3) forming a front (2) and a cap (3), these being assembled together to define jointly an enclosure (4) for housing an electronic card (1) provided with remote connectors (13), wherein at least one first shell (3) is formed from at least two elementary shells (18) and said first shell (3) includes, molded into it, at least one mobility means allowing relative movement between the elementary shells. The first shell (3) is formed in one piece, the two elementary shells (18) are situated side by side, each comprising a window for the passage and/or reception of a connector (13), and said mobility means comprises an elastically deformable member (26).

12 Claims, 7 Drawing Sheets

INFORMATION DEVICE, METHOD FOR INFORMING AND/OR NAVIGATING A PERSON, AND COMPUTER PROGRAM

BACKGROUND INFORMATION

The present invention relates to an information device for informing persons, according to the preamble of claim 1, and to a related method and a computer program.

Information systems are often used in public buildings, such as hospitals, train stations, and airports, and in commercial establishments, such as production plans, office buildings, etc., or in private buildings, and, according to the most general definition, are used to provide information signals to persons who are in the areas described above.

Laid-open application DE 10 2005 021 736 A1, for example, makes known a device for controlling rescue actions, in the case of which sensors are located in an area that is accessible to persons and should be monitored. The sensors locate the persons and determine rescue actions based on the location of the persons, the characteristics of the area, and the location of at least one source of danger. Microphones, as sensors, and loudspeakers, which are distributed within the area to be monitored, are connected to at least one computer of the device. The loudspeakers may be situated in such a manner and they may be controllable by the computer in such a manner that the persons to be guided hear the announcements from the direction in which they are to be guided. It is also provided that other monitoring systems, e.g., a video monitoring system, be used to monitor the escape routes from the dangerous areas.

Laid-open publication DE 43 14 2 86 A1 proposes a device for guiding persons along defined paths in buildings, building complexes, or the like; a destination-guidance unit is located at junctions or intersections and includes a control unit, an input unit for inputting destination information that corresponds to the destination sought by a person, a memory unit in which direction instructions for each destination are stored, and a directions unit, via which—controlled by the control unit—the corresponding direction instructions may be output to the display after destination information has been entered and the memory unit has been accessed.

WO 93/032 622 A2, which is the closest prior art, makes known a video monitoring system that is used as an alarm system. The video monitoring system is designed such that a virtual "trip wire" is set up within the image region of a surveillance camera; when a moving object passes through the trip wire, a global alarm is triggered in a building that is protected via the monitoring system or alarm system.

DISCLOSURE OF THE INVENTION

The present invention provides an information device for informing persons or other mobile objects, having the features of claim 1, a method for informing and/or navigating a person, having the features of claim 12, and a computer program which includes program code means, having the features of claim 13. Preferred or advantageous embodiments of the present invention result from the dependent claims, the description that follows, and/or the attached figures.

The subject matter of the present invention relates to an information device which is designed and/or is suitable for outputting one or more information signals to one or more persons or mobile objects, which are collectively referred to as persons. The mobile objects may be designed, e.g., as robots, preferably as service robots, in particular as carpet- or floor-cleaning robots that are informed via the information device. The information device includes at least one surveillance camera which is designed, e.g., as a CCD-, CMOS-, black-white or color camera, and which is used to output a sequence of images. The surveillance camera is preferably designed as a stationary camera; in modified embodiments, the surveillance camera may also be realized as a moving camera. Special designs of cameras, e.g., 360° viewing field cameras, are also possible. The at least one surveillance camera is positioned and/or may be positioned in a manner that enables it to monitor a monitored area in which one or more persons may be present. The information device also includes at least one output device for outputting an information signal that is suited and/or designed to inform persons.

An evaluation device, which is realized, e.g., as a data processing device, is suited and/or designed to detect and/or track a person as a registered person in the monitored area; the registered person is preferably the same person who is informed by the information signal. Optionally, and in addition thereto, the evaluation device may also be designed to detect and/or track a group of persons. The detection and/or tracking of the registered person is carried out in an image-assisted manner, in particular using digital image processing and/or video content analysis based on the image sequences from at least one surveillance camera. The evaluation device is also suited and/or designed to activate the output device for outputting the information signal based on the detection and/or tracking of the registered person. The output device is preferably activated when predefined conditions are met regarding the status, i.e., the existence, position, direction of motion and/or rate of motion and/or trajectory of the registered person or registered group of persons.

The present invention provides that the evaluation device is programmed and/or electronically configured to determine the current position, in particular, of the registered person, and to activate the at least one output device based on the position in order to selectively output the information signal to the position and/or the registered person.

To attain delineation from publication WO 03/032 622 A2 mentioned above, it is therefore provided to not output a global alarm signal that is directed to a plurality of persons regardless of their position, but rather to selectively direct the information signal to the position and/or selectively to the registered person. The information signal therefore serves as feedback on the behavior of the registered person.

One consideration of the present invention is that the information device according to the present invention should be used to determine, based on a video analysis, the position of a registered person, e.g., via object tracking, and, if necessary, to output a selective information signal to the registered person. In contrast to the known prior art, when it is recognized via video monitoring that conditions have been met or exceeded, information is not communicated initially to third parties such as surveillance personnel, but rather the information device directs the information signal directly and/or exclusively to the registered person. This results in a large number of new applications, as will be explained further below. A further optional advantage is that surveillance personnel or service personnel are not called upon to act, since the information signal is sent primarily to the registered person.

In a preferred embodiment of the present invention, the output device is designed to output the information signal selectively in terms of location or person. The information signal is preferably output selectively by location by enabling the output device to output the information signal at various separate locations, in particular at more than two separate locations or positions. The information signal is output selectively by person by outputting the information signal depending on the registered person. For example, an information signal "a" is output to a registered person A, and an information signal "b" is output to a registered person B. As an alternative or in addition thereto, several output devices, which may be activated in a selective manner, in particular selectively in terms of location or person, are distributed and/or may be distributed among various locations.

In one possible simple embodiment, the information device is composed of exactly one surveillance camera and one or more output devices which are located in the monitored area or in an area that is perceptible by the registered person outside of the monitored area.

The information signal is preferably designed as an optical, acoustic, and/or tactile signal. In a preferred development of the present invention, the information signal includes the carrier signal and content information. The carrier signal is preferably understood to mean the physical signal, which contains supplemental content information in the form of optical, acoustic, and/or tactile information. The content information is preferably configured as direction information, a message, or language- and/or text-based information. Examples of information signals of this type are navigation signals, warning messages, product information, advertisements, object descriptions, or the like.

In a preferred realization of the present invention, the output device is designed as a visual output device, in particular as a laser device, a projection device, a display screen, or an activatable information board. Using the laser device, it is possible to temporarily write the content information on a surface, e.g., on a floor, in particular in various positions. The projection device makes it possible to project information, e.g., in the form of a text block, an arrow, or the like. The display screen makes it possible to display the content information, also preferably in the form of a text block, or a pictogram, in particular a pictogram of a route to take. The activatable information board includes, e.g., a plurality of activatable information devices, such as monochromatic or multicolored light sources, message boards, e.g., in airports or train stations, or activatable characters. As an alternative or in addition thereto, the output device is designed as one or more loudspeakers that implement the selective output by outputting an acoustic signal selectively by location, and/or that implement the person-selective output using acoustic content information. In a preferred embodiment, the output device is designed as a public address system. In one possible embodiment, the evaluation device is designed to activate the output device—based on the detection and/or tracking of the registered person—in such a manner that focused or harmful signal effects, in particular due to lights or lasers, are not directed to the registered person, in particular to the face of the registered person.

In a further possible alternative or supplementation, the output device is designed as a portable unit that is carried and/or may be carried by the registered person. In this case, the information signal is output to the portable unit that is being carried by the registered person. To this end, the portable unit may contain all of the output devices described above, in particular a loudspeaker and/or a screen. It is preferably provided that the portable unit is designed to display a map of the monitored area, the map being transmitted, e.g., via the evaluation device, to the portable unit in order to display the current position of the registered person in this map. The portable unit is preferably designed as a cellular telephone or a PDA, or as another type of mini-computer. The information signal and/or the map may be transmitted, e.g., via Bluetooth, WLAN, or the cellular telephone network. In particular, direction information, e.g., an arrow, is displayed as the information signal on the portable unit. In this embodiment, the portable unit behaves in the same manner as a known navigation system, although the localization of the registered person is not carried out by a global coordinate receiver, e.g., a GPS module, but rather by the evaluation device via the processing of the video signals from the at least one surveillance camera.

In a preferred development of the present invention, the information device includes a plurality of surveillance cameras of this type, which are positioned and/or may be positioned in a manner that enables them to monitor a monitored scene; the monitored scenes are combined to form the monitored area. Using this embodiment, it is possible to selectively provide information signals to a registered person in complex environments, such as large buildings, building complexes, or several buildings away.

The evaluation device preferably includes a tracking module which is designed to track the registered person throughout the plurality of surveillance scenes or via the plurality of surveillance cameras. Since it is often the case that not every area in a complex environment, e.g., in a building, is monitored, or that the viewing fields of the surveillance cameras do not overlap, the tracking module is designed to re-identify the registered person if he has temporarily become lost because he entered a non-monitored area. According to one possible implementation of tracking, the evaluation system extracts certain features from images of the registered person obtained using the surveillance cameras, such as a color histogram, pattern, size, etc., and re-identifies the registered person based on these features. The tracking module is preferably designed to create an appearance model of the person in order to track the person throughout the various monitored scenes or via the various surveillance cameras in the monitored area. In a preferred embodiment of the information device, the surveillance cameras are therefore designed as a video monitoring system which is often already installed in complex environments. Furthermore, set-up costs for the information device may be saved by using a public address system in order to selectively output the information signal. In this case, the integration of the information device is reduced to the linking of the video surveillance system to the public address system for information-related purposes.

In a preferred development of the present invention, the evaluation device includes a map module which may access a model of the monitored area. In a preferred embodiment, the model is designed as a basic outline or layout of the complex environment or building. In particular, the model has been loaded with the position and/or orientation of the surveillance camera(s) and/or the output device(s). In a preferred implementation of the information devices, the surveillance cameras are calibrated by location, and therefore the evaluation device may determine the relative and/or absolute coordinates of the registered person in the monitored area. In this manner, it is also possible to load the position and trajectory, i.e., the direction and rate of motion, of the registered person in the model using the correct position.

In this embodiment, advantages are attained in particular by the fact that the evaluation device is designed to locate the registered person by calculating the position and/or trajectory of the registered person using the model of the monitored area, and to selectively inform the registered person using information signals via the selective activation of one or more of the output devices in the monitored area.

In a development of the present invention, the information device includes a registration module which is designed to register a person automatically and/or via user input. Automatic registration is carried out, e.g., by a person meeting predefined conditions which, in the simplest case, is that the person enters the monitored area. From this moment forward, the person is tracked as a registered person via the evaluation device so that information signals may be selectively output to the registered person. For example, a person is automatically registered by the registration module when he enters a shopping mall, and advertisements or instructions are then selectively output as information signals to the registered person, e.g., depending on his current position.

When registration is carried out via user input, either the person to be registered or a third party performs the user input. As an example of registration carried out via user input, a person enters a shopping mall and uses an information terminal to enter a query—as the registration information—for a certain place, store, or location in the mall, which is the monitored area. If the person requires directions, the person may communicate this to the information terminal, and the evaluation system will calculate a route to the desired location and register the person. The registered person is then guided to this location using selective information signals.

In a first optional embodiment, the information device is designed as a navigation system, in particular a navigation system in a building, the position and/or trajectory of the registered person being determined via the evaluation device based on the image sequences obtained by the surveillance cameras. In this embodiment, it is provided, as an option, that the person who requires navigation assistance enters a destination or an object he is searching for into a navigation terminal, or a third party enters this information, whereupon the position is registered, and the person is guided via the information device to the desired destination or object using selective information signals. In another preferred embodiment, the information device is designed as a control system which guides a person to be guided to a destination in a similar manner. In a further embodiment, the information device is designed as an explanation system which selectively outputs specific explanations to a registered person as information signals. A system of this type may be used, e.g., in museums, in which case, once it is determined that a visitor is standing in front of an exhibit, explanations of the particular exhibit are selectively output to the visitor as information signals. In a further embodiment, the information device is designed as an advertisement distribution system which outputs advertisements to the registered person, e.g., depending on his location.

A further subject matter of the present invention relates to a method for informing and/or navigating a person, as a registered person, in a monitored area, in particular in a closed building, preferably using the information system of the type described above, and as recited in one of the preceding claims. According to the method, in a first step, a person is defined as a registered person, the position and/or trajectory of the registered person is detected in an image-assisted manner, and an information signal is selectively output to the registered person depending on the position and/or trajectory and/or an information request, e.g., a navigation request.

A further subject matter of the present invention relates to a computer program which includes program code means having the features of claim 13.

BRIEF DESCRIPTION OF THE DRAWINGS

Further features, advantages, and effects of the present invention result from the description that follows, and from the figures which show preferred embodiments of the present invention.

Parts that are similar or identical in the various figures are labeled with similar or identical reference numerals.

EMBODIMENT(S) OF THE INVENTION

Figure 1:
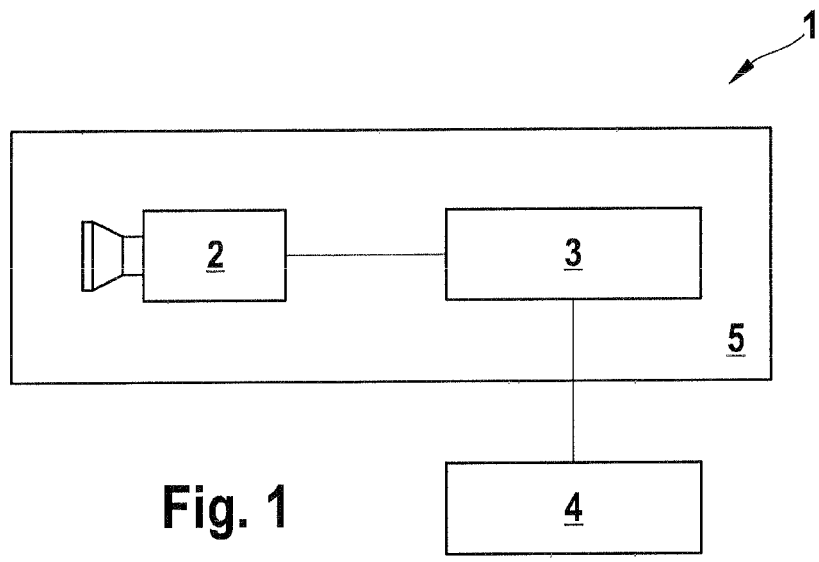
FIG. 1 shows a schematic block diagram of an information device, as a first embodiment of the present invention.

FIG. 1 discloses, in a schematic block diagram, an information device 1, as a first embodiment of the present invention. Information device 1 includes a surveillance camera 2 which is directed toward a surveillance scene in a monitored area. The image sequences obtained by surveillance camera 2 are forwarded to an evaluation device 3 which evaluates the image sequences using digital image processing. Depending on the results of the evaluation, an output device 4 is activated by evaluation device 3 which selectively outputs an information signal to a registered person (not depicted). Evaluation device 3 processes the image sequences, and persons in the surveillance scene or monitored area are detected and/or tracked. For example, the moving persons are separated from a scene background and tracked over time, thereby enabling the position and trajectory of the moving person to be determined. Surveillance camera 2 and evaluation device 3 form a video monitoring system 5. As soon as certain conditions, e.g., the attainment of a certain position and/or a certain direction or rate of motion, are met, evaluation device 3 activates output device 4 which then outputs a selective information signal to the registered person. Output device 4 is designed to output the information signal in a selective manner according to location and/or person. For this purpose, the information signal is targeted, e.g., selectively to the person, or it is output in an area that is perceptible by the person.

Figure 2:
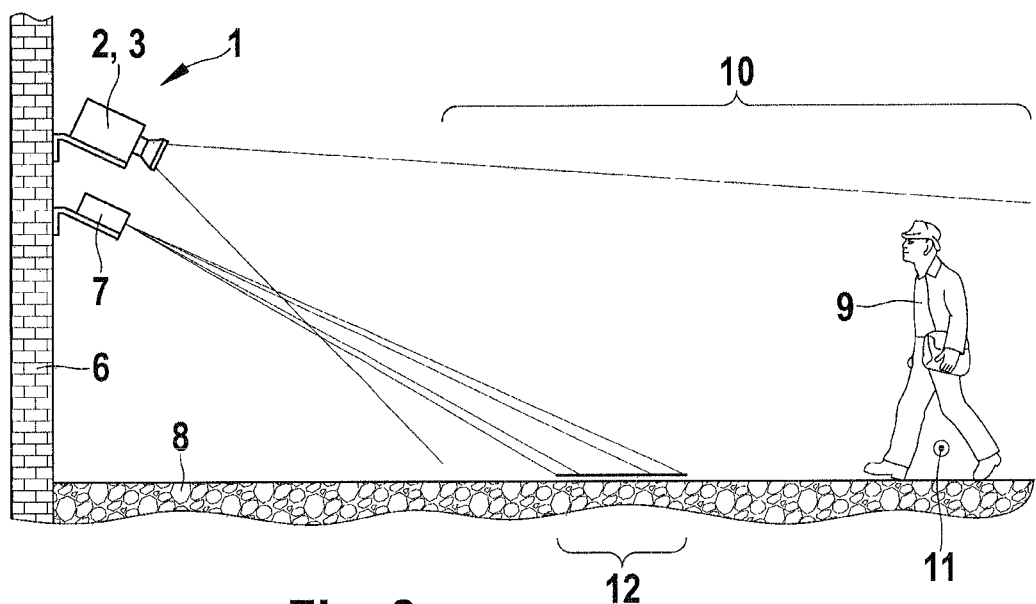
FIG. 2 shows a schematic illustration of an optional integration of the information system in FIG. 1.

FIG. 2 shows an example of an integration of information device 1, in a schematic illustration. Information device 1 is mounted on a wall 6 or the like, and surveillance camera 2 and evaluation device 3 are integrated in the camera housing. An output device, designed as a laser projector 7, is positioned separate therefrom. When a person 9 enters surveillance scene 10, this person is detected via surveillance camera 2, and the position and/or trajectory of person 9 is determined by evaluation device 3. Person 9 shall be considered hereinbelow to be the registered person. As soon as certain conditions are met, e.g., a virtual line 11 is crossed, evaluation device 3 activates laser projector 7 in order to project—in a manner that is selective for person 9—an information signal 12 in the form of a graphical depiction, a text, or a pictogram on floor 8; information signal 12 is perceptible only within the vicinity of person 9.

Figure 3:
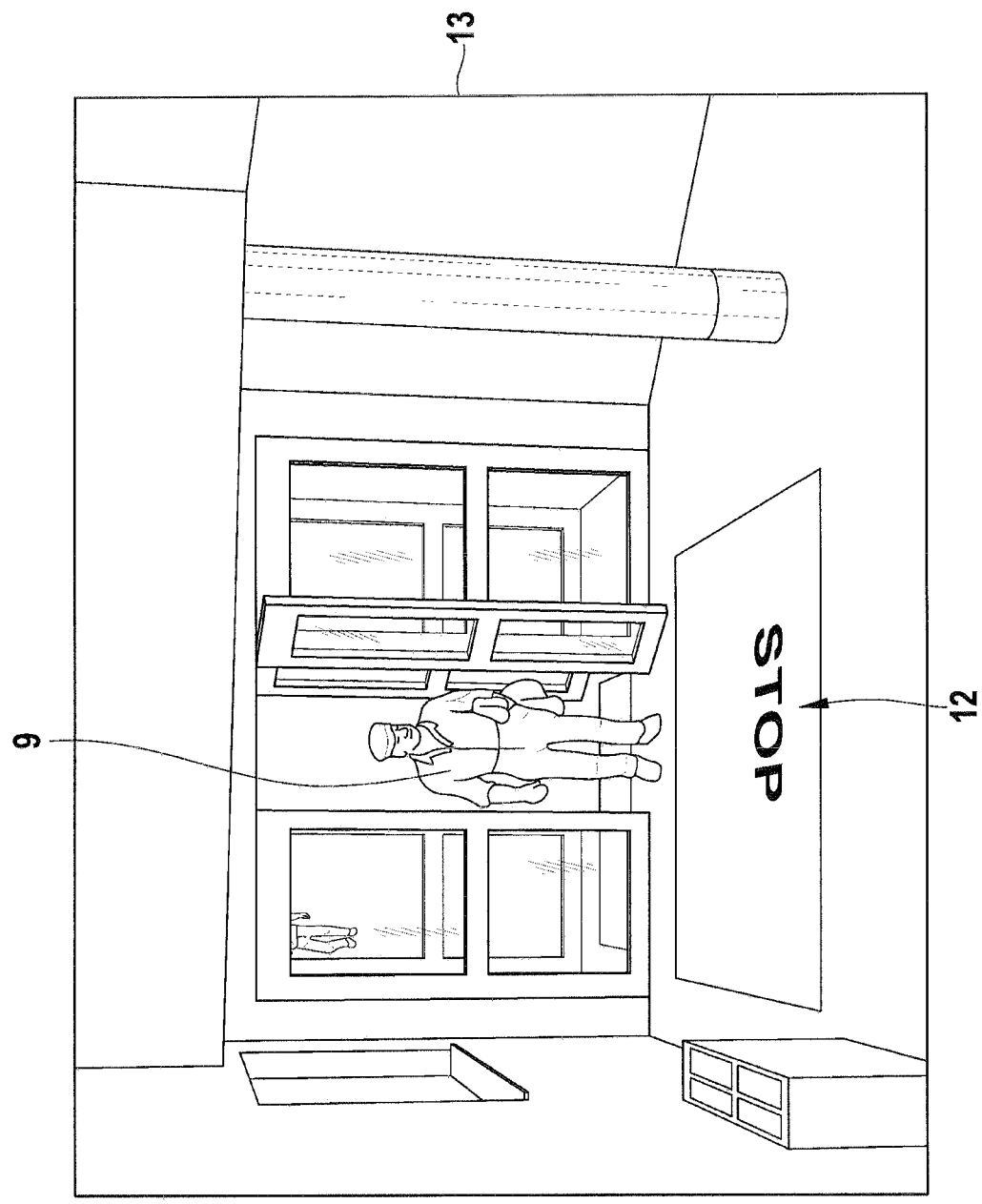
FIG. 3 shows an example of an information signal in a monitored area, to illustrate the mode of operation of the present invention.

FIG. 3 shows an example of a surveillance image 13 obtained by information device 1 in FIG. 1 or 2, in which the word "Stop", as selective information signal 12, is projected onto the floor for registered person 9 when he enters a room. Using information device 1, person 9 is therefore warned—automatically and in real time—against continuing to perform certain activities, such as entering a forbidden area. Since the information signal appears directly in front of person 9, it is obvious to person 9 that the information signal is intended for him. Information device 1 is therefore used to ensure that person 9 understands that he is being observed, and that information signal 12 is intended exclusively for him, thereby providing person 9 the opportunity to correct his behavior in terms of where he walks. If person 9 does not correct his behavior, it is possible, as an option, for an alarm signal to be triggered in order to inform surveillance personnel and allow them to handle the situation.

As another possible application, which is not shown, person 9 in a dangerous situation is shown a selective information signal, e.g., in the form of the projection of an arrow which shows person 9 the way to the closest emergency exit.

Figure 4:
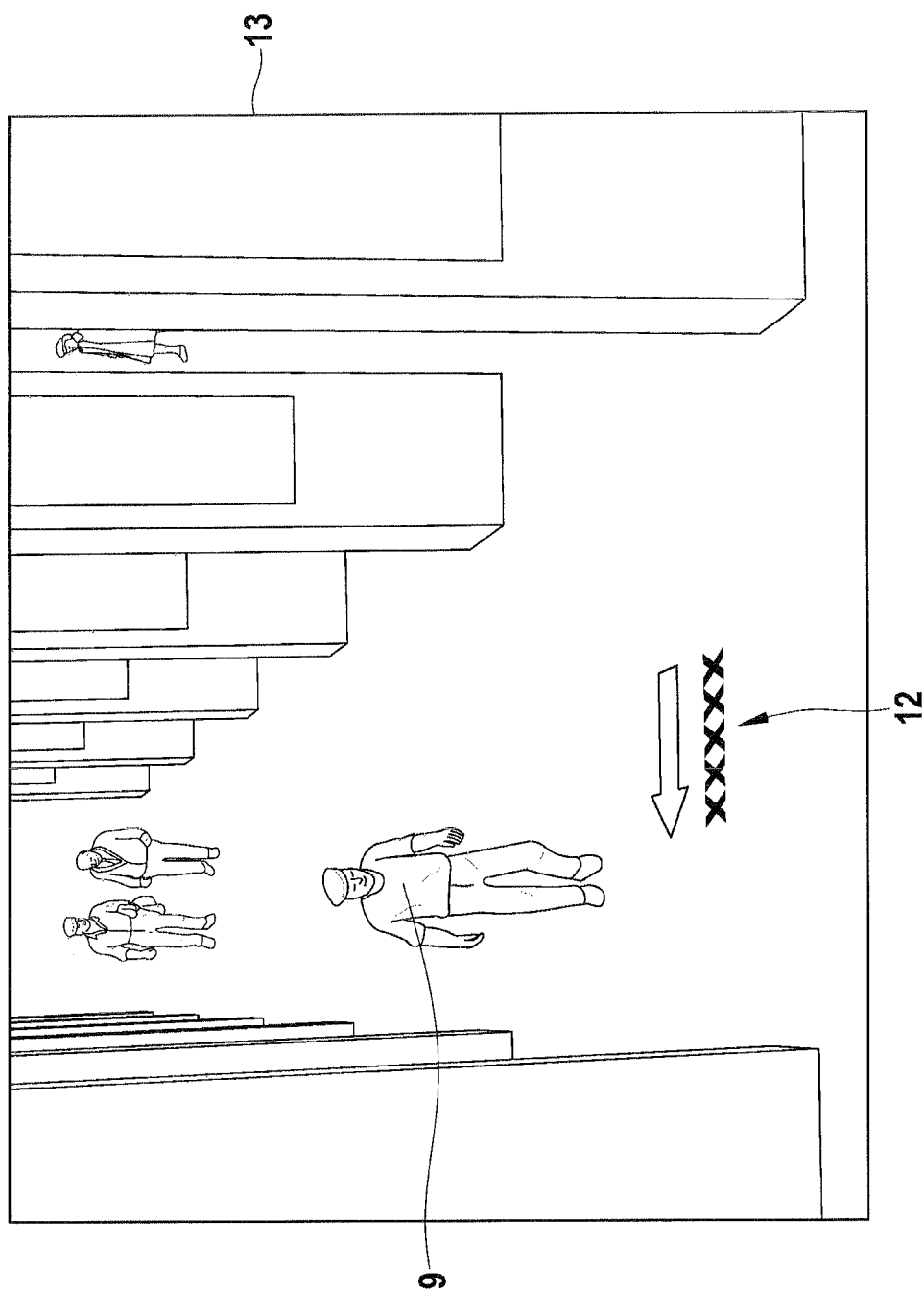
FIG. 4 shows a further information signal in a surveillance image, as a further illustration of the mode of operation of the information system.

In a further field of application of information device 1, an information signal 12 designed as an advertisement is transmitted selectively to person 9, e.g., in a shopping mall. This potential application is visualized in FIG. 4, in which a registered person 9 in a shopping mall meets certain conditions, e.g., he stops in front of a certain store; an advertisement "xxxx", as information signal 12, and, optionally, an arrow that points in the direction of the advertised item in the shopping mall is projected for registered person 9 onto the floor.

Figure 5:
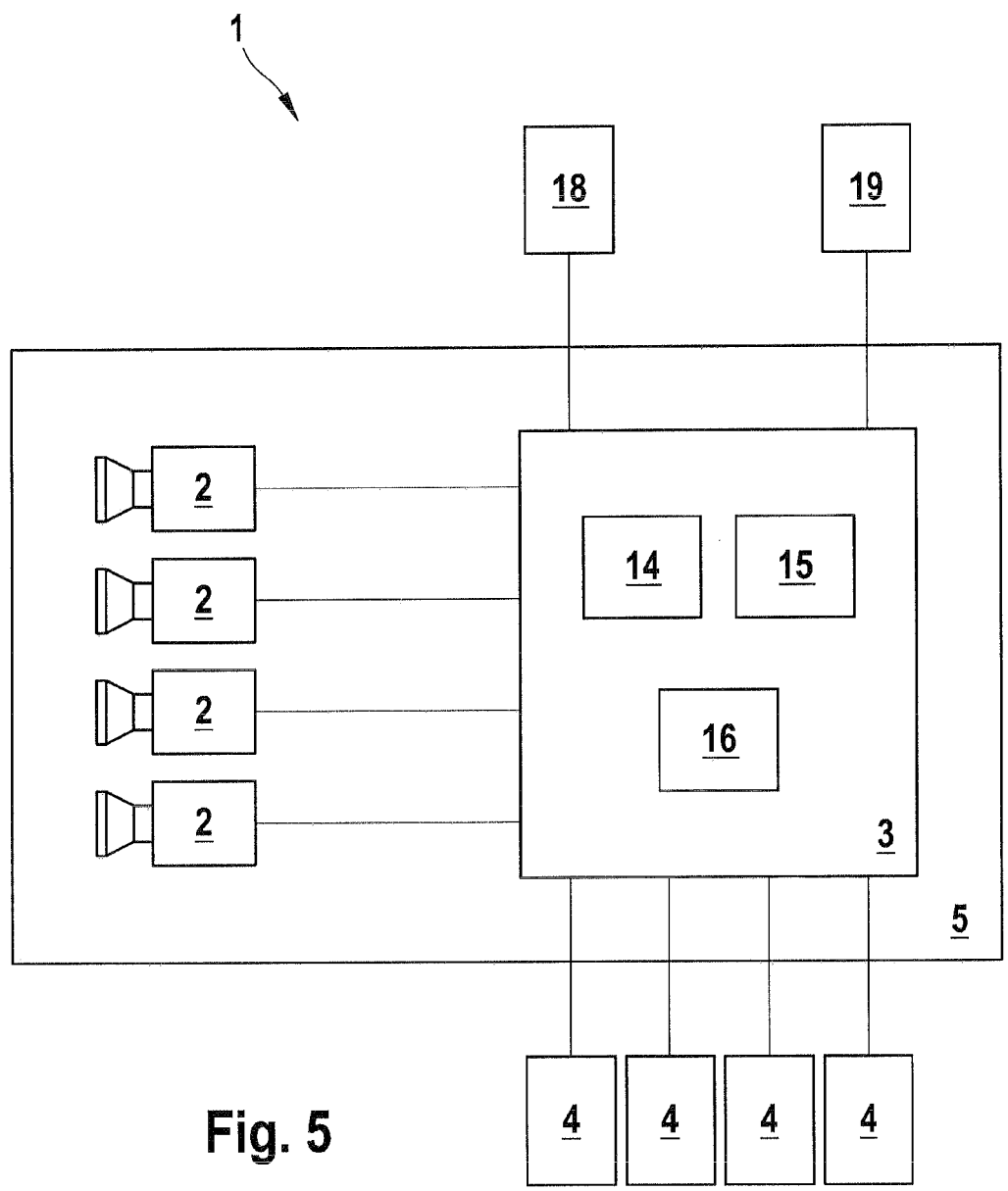
FIG. 5 shows a block diagram of an information system, as a second embodiment of the present invention.
Figure 6:
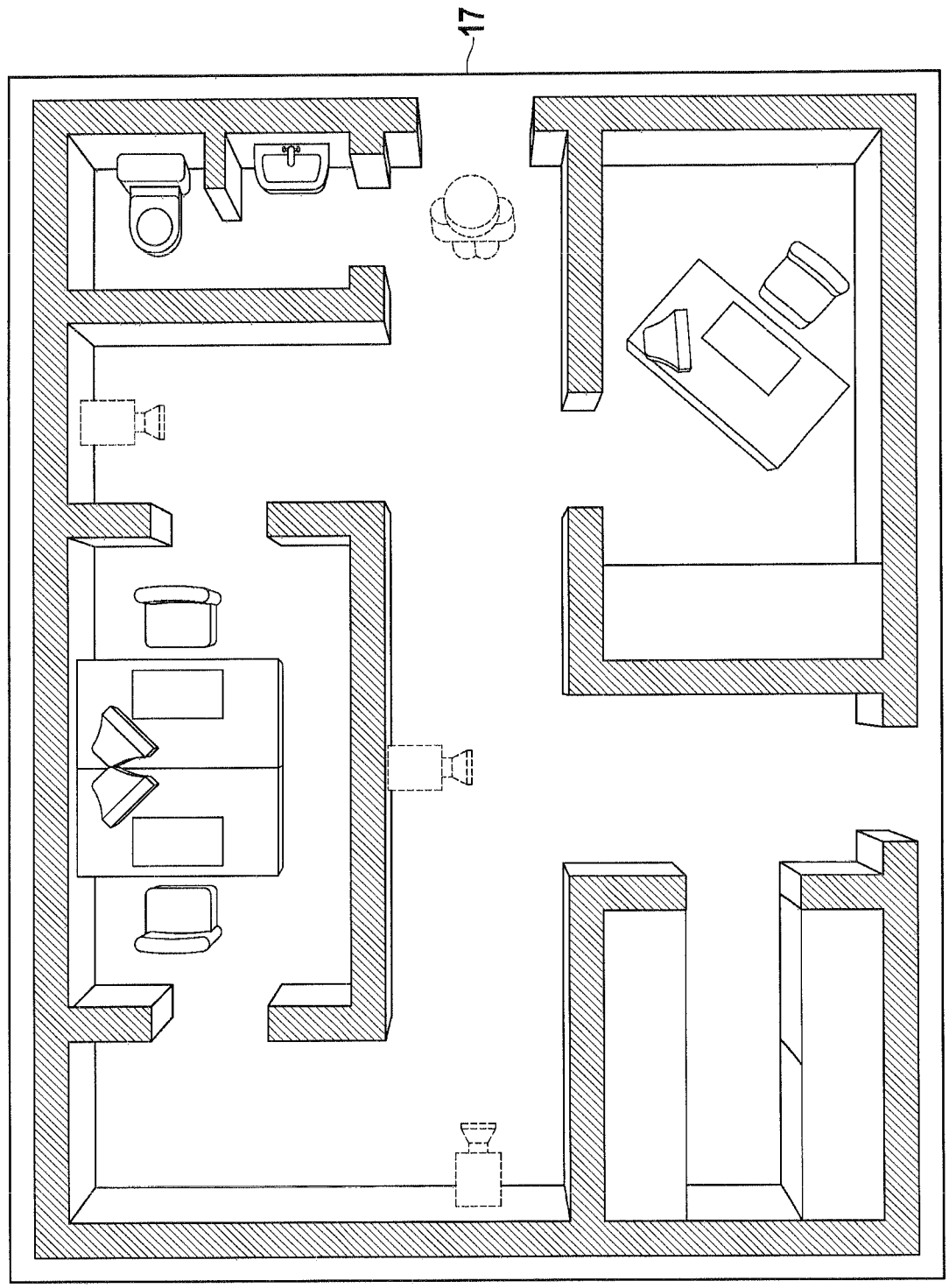
FIG. 6 shows a schematic illustration of a model of a monitored area for use in the information system according to FIG. 5.

FIG. 5 shows, in a schematic block diagram, a second embodiment of information device 1 which includes a plurality of surveillance cameras 2, an evaluation device 3, and a plurality of output devices 4. Surveillance cameras 2 are directed toward a plurality of surveillance scenes which collectively form the monitored area. Output devices 4 are distributed within the monitored area, thereby making it possible to utilize various output devices 4 in various surveillance scenes. Evaluation device 3 includes an object detection module 14 which is designed to detect moving objects, in particular persons 9, in front of a static background, and a tracking module 15 which is designed to track persons 9 in the monitored area, even across several surveillance scenes. Evaluation device 3 also includes a map module 16 which may access a model, e.g., a map or a building layout. An exemplary model designed as a 3-D model 17 is shown in FIG. 6; 3-D model 17 shows the layout and stationary objects. Moreover, the 3-D model or map module 16 may be loaded with the position and/or orientation of surveillance camera 2 and/or the position and/or orientation of output device 4. In a particularly preferred embodiment, surveillance cameras 2 are calibrated according to location, and so the position and/or trajectory and/or size of registered person 9 may be loaded into the model, or they may be calculated using the model.

As an option, information device 1 includes a registration module 18 which is used to manually register a person as registered person 9. As a further option, information device 1 includes an information terminal 19, using which the person or a third party may enter an information query for evaluation device 3.

Information device 1 is designed to locate and/or track registered persons 9 in monitored areas, e.g., in buildings, and the localization and/or tracking information is used to automatically guide the registered persons to predetermined areas. Information device 1 is therefore a navigation system for guiding or directing registered persons 9, and it may be used, e.g., in airports, museums, hospitals, or office buildings.

In a first realization, output devices 4 are designed as a public address system, or they include at least one public address system, thereby making it possible for the selective information signals to be output by loudspeakers that are selectively utilized by evaluation device 3.

Figure 7:
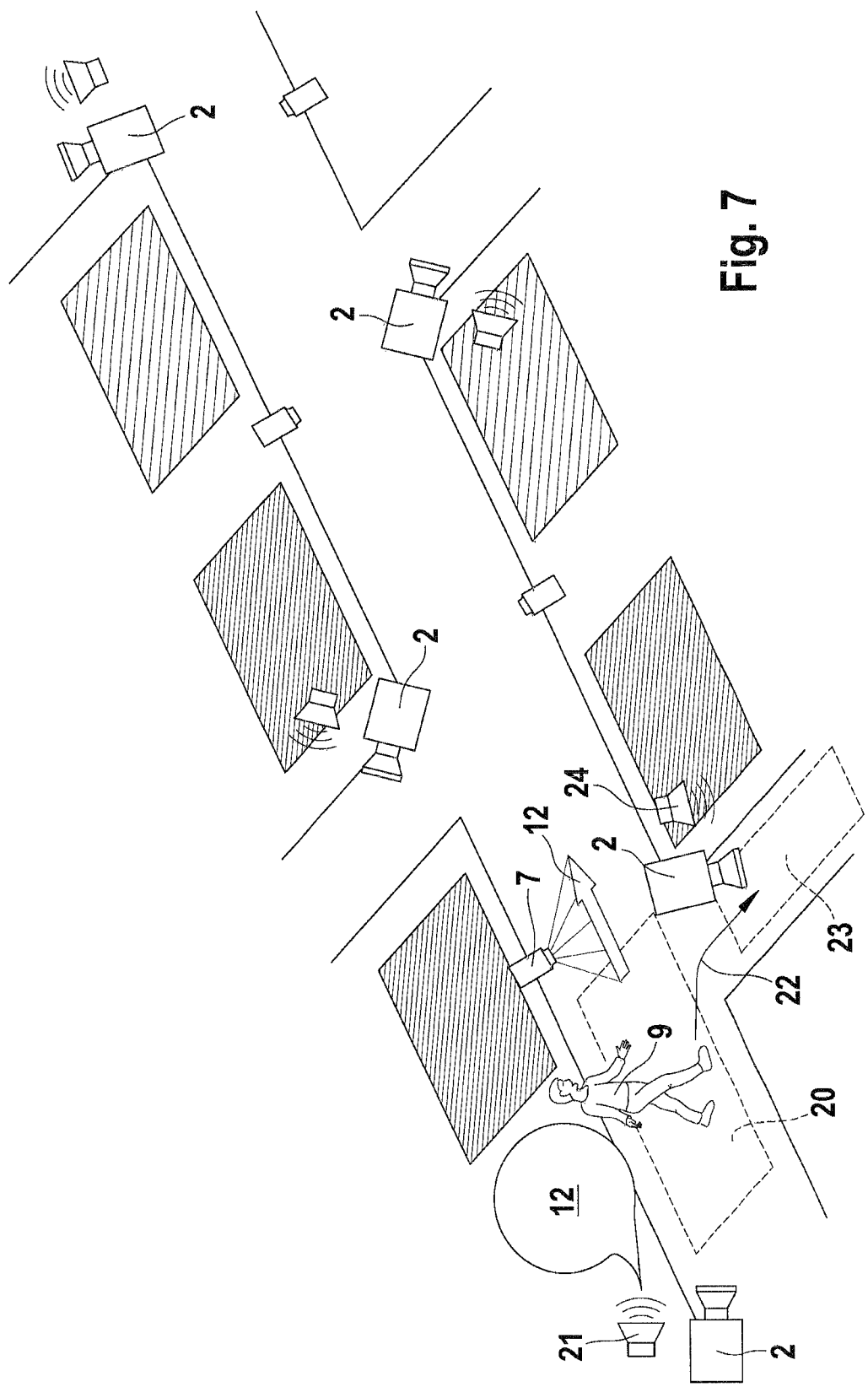
FIG. 7 shows a schematic illustration of a first application of the information system according to FIG. 5.

FIG. 7 shows a schematic depiction of a possible application of information device 1, in the form of a navigation system. To start the guidance of a person, the person walks up to information terminal 19 (FIG. 5) and enters an information query in the form of a route query. The person may then report himself as a registered person in registration module 18, and he is subsequently guided through the building by information device 1. FIG. 7 shows a plurality of surveillance cameras 2 which are used for this purpose, surveillance cameras 2 being directed toward various surveillance scenes. As soon as evaluation device 3 detects the position of registered person 9 in a first area 20, a loudspeaker 21, as output device 4, located in this area is selectively activated and communicates direction information, as selective information signal 12, to registered person 9, e.g., "continue straight ahead". In addition, a second output device, which is designed as a laser projector 7, projects an arrow, as selective information signal 12 in first region 20, onto the floor; the arrow represents the same direction information. As soon as registered person 9, e.g., incorrectly turns right as indicated by arrow 22 and enters a second area 23, a selective information signal, which notifies registered person 9 that he is going the wrong way, is output by a further loudspeaker 24. As soon as registered person 9 enters the region closest to an output device 4, he is provided, in a similar manner, with direction information that has been updated accordingly.

Figure 8:
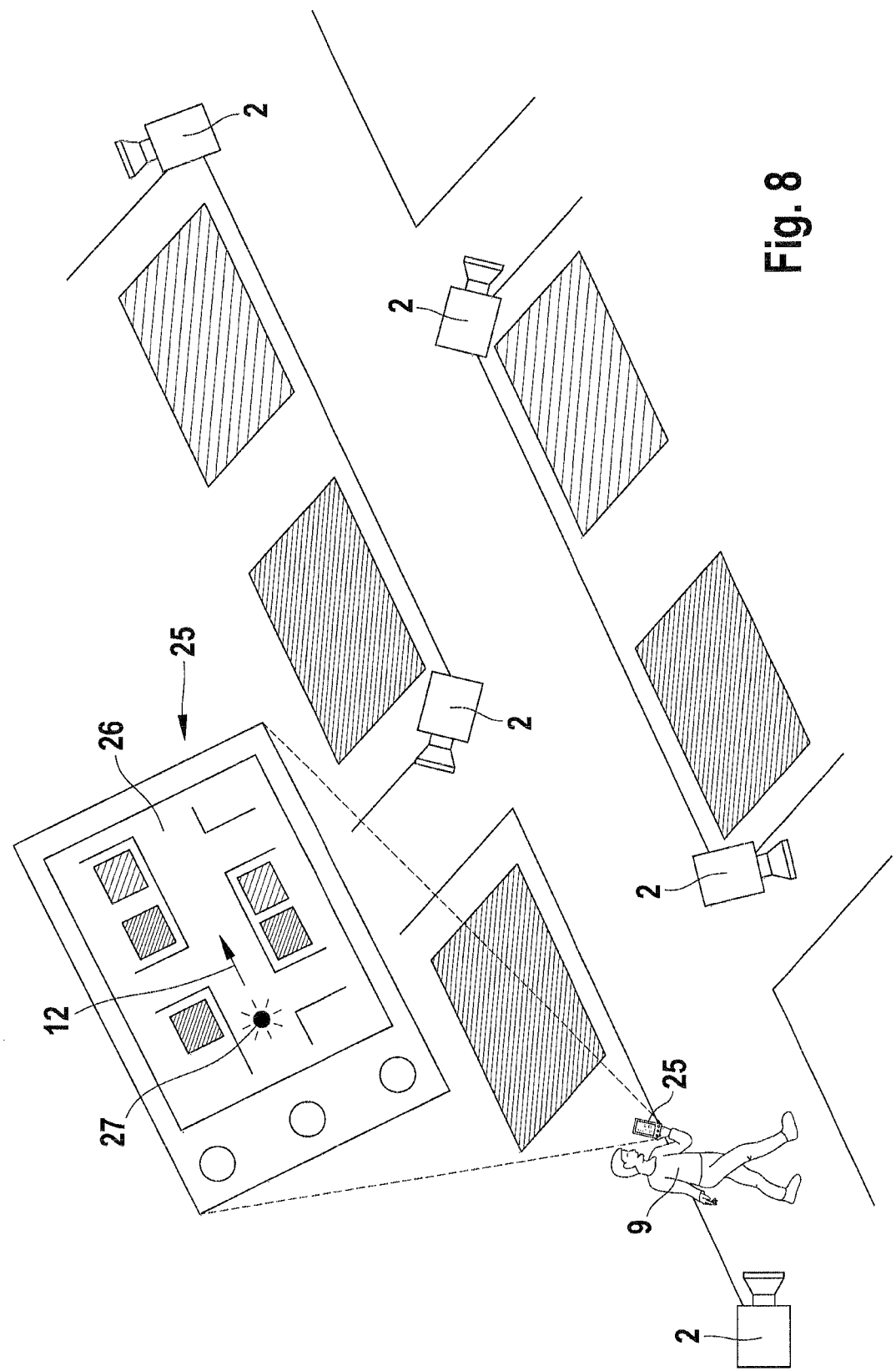
FIG. 8 shows a schematic illustration of a second application of the information system according to FIG. 5.

FIG. 8 shows a second embodiment of information device 1 according to FIG. 5; in this case, a PDA (personal digital assistant) 25 is used as the output device. PDA 25 communicates with evaluation device 3, e.g., via WLAN or Bluetooth. A layout of the building and an information signal 12 in the form of an arrow, and the current position in the form of a dot 27 are displayed to registered person 9 on display screen 26 of PDA 25. This display is also continually updated by evaluation unit 3, and therefore registered person 9 has continual access to current direction information, as information signal 12.

What is claimed is:

1. An information device (1) for informing persons (9) or other mobile objects, collectively referred to below as "person" or "persons," comprising:
   at least one surveillance camera (2) which is positioned and/or may be positioned to monitor a monitored area in which persons may be present,
   at least one output device (4) for the output of an information signal (12),
   a registration module (18) designed to register a person as a registered person (9) in the monitored area automatically, via user input or both; and
   an evaluation device (3) for the image-assisted detection and/or tracking the registered person (9) in the monitored area and for activating the output device (4) to output the information signal (12) based on the detection and/or tracking of the registered person (9),
   wherein the evaluation device (3) determines a position of the registered person (9) and activates the least one output device (4) to selectively output the information signal (12) to the position and/or to the registered person (9).

2. The information device (1) as recited in claim 1, wherein the output device (3) is designed/may be activated to output the information signal (12) selectively in terms of location or person, and/or wherein several output devices (4) which may be activated in a selective manner, in particular selectively in terms of location or person, are distributed and/or may be distributed among various locations.

3. The information device (1) as recited in claim 1, wherein the information signal (12) is an optical, acoustic, and/or tactile signal.

4. The information device (1) as recited in claim 1, wherein the information signal (12) carries the carrier signal, content information, in particular direction information, a message, and language- and/or text-based information.

5. The information device (1) as recited in claim 1, wherein the output device (4) is designed as a visual output device, in particular a laser device (7), a projection device, a display screen or an activatable information board, and/or as a loudspeaker (21, 24), in particular a public address system.

6. The information device (1) as recited in claim 1, wherein the output device (4) is designed as a portable unit (25) that is carried and/or may be carried by the registered person (9).

7. The information device (1) as recited in claim 1, characterized by a plurality of surveillance cameras (2) which are positioned and/or may be positioned in a manner that enables them to monitor a monitored scene; the monitored scenes are combined to form the monitored area.

8. The information device (1) as recited in claim 1, wherein the evaluation device (3) includes a map module (16) which may access a model (17) of the monitored area, the model (17) having been loaded with the position and/or orientation of the surveillance camera or cameras (2) and/or the output device or devices (4).

9. The information device (1) as recited in claim 8, wherein the evaluation device (3) is designed to inform the registered person using information signals by calculating the position and/or trajectory of the registered person (9) using the model (17) of the monitored area via the selective activation of the output device (4) or several output devices (4) in the monitored area.

10. The information device (1) as recited in claim 1, characterized by the fact that it is designed as a navigation system and/or a control system and/or an explanation system and/or an advertisement distribution system.

11. A method for informing and/or navigating a person as a registered person (9) in a monitored area using the information system (1) as recited in claim 1, comprising steps of:

registering a person as a registered person (9), determining a position and/or trajectory of the registered person (9) using image-assisted object detection and/or tracking, and, outputting an information signal (12) on a selective basis depending on the position and/or trajectory of the registered person (9).

12. A computer program comprising program code means for carrying out all steps of the method as recited in claim 11 when the program is run on a computer and/or a device (1).

* * * * *